United States Patent
Kesavan et al.

(10) Patent No.: US 9,727,288 B2
(45) Date of Patent: Aug. 8, 2017

(54) METHODS AND SYSTEMS FOR AUTOMATICALLY PRINTING FILES

(71) Applicant: XEROX CORPORATION, Norwalk, CT (US)

(72) Inventors: Narayan Kesavan, Chennai (IN); Muralidaran Krishnasamy, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/938,869

(22) Filed: Nov. 12, 2015

(65) Prior Publication Data

US 2017/0139652 A1    May 18, 2017

(51) Int. Cl.
*G06F 3/12* (2006.01)

(52) U.S. Cl.
CPC ............ *G06F 3/128* (2013.01); *G06F 3/1204* (2013.01); *G06F 3/125* (2013.01); *G06F 3/1254* (2013.01); *G06F 3/1257* (2013.01); *G06F 3/1287* (2013.01)

(58) Field of Classification Search
None
See application file for complete search history.

(56) References Cited

U.S. PATENT DOCUMENTS

| | | | |
|---|---|---|---|
| 5,860,066 A | 1/1999 | Rouse | |
| 5,969,826 A | 10/1999 | Dash et al. | |
| 7,844,749 B2 | 11/2010 | Tredoux et al. | |
| RE42,290 E | 4/2011 | Ogino | |
| 8,817,319 B2 | 8/2014 | Martin | |
| 9,009,359 B2 | 4/2015 | Ashok et al. | |
| 9,185,245 B2 | 11/2015 | Miyachi et al. | |
| 9,245,130 B2 | 1/2016 | Ashok et al. | |
| 9,245,131 B2 | 1/2016 | Ashok et al. | |
| 2005/0051942 A1 | 3/2005 | Kubo et al. | |
| 2006/0132841 A1 | 6/2006 | Park et al. | |
| 2006/0221372 A1* | 10/2006 | Onishi | G06F 3/1204 358/1.13 |
| 2007/0109600 A1 | 5/2007 | Ren et al. | |
| 2007/0229899 A1* | 10/2007 | Okuda | G06F 3/1204 358/1.16 |
| 2008/0080001 A1 | 4/2008 | Yamada | |
| 2009/0128862 A1 | 5/2009 | Nolepa et al. | |
| 2010/0231968 A1* | 9/2010 | Hirasawa | G06F 3/1204 358/1.15 |
| 2011/0242580 A1* | 10/2011 | Tran | G06F 3/1205 358/1.15 |
| 2011/0292430 A1 | 12/2011 | Kang et al. | |
| 2012/0140266 A1* | 6/2012 | Takayama | G06K 15/4095 358/1.15 |

(Continued)

*Primary Examiner* — John Wallace
(74) *Attorney, Agent, or Firm* — Fox Rothschild LLP

(57) ABSTRACT

Disclosed are a system, an apparatus, and a method for automatically printing printable files stored inside an external storage device without any intervention of a user. The apparatus comprises a peripheral port for communicating with the external storage device and a control section comprising a memory for storing computer readable program code and a processor for executing the code to control the apparatus. The computer readable program code being configured to cause the apparatus to execute a process for determining availability of the optional instruction in the external storage device and printing at least one copy of the fetched printable files based on the determined availability of the optional instruction.

63 Claims, 6 Drawing Sheets

(56) References Cited

U.S. PATENT DOCUMENTS

| | | | |
|---|---|---|---|
| 2012/0194850 A1* | 8/2012 | K. ........................ | G06F 3/1204 358/1.15 |
| 2012/0218605 A1 | 8/2012 | Yamada | |
| 2012/0307316 A1 | 12/2012 | De Muelenaere et al. | |
| 2013/0120799 A1* | 5/2013 | Maeda .................. | G06F 3/1296 358/1.15 |

* cited by examiner

METHODS AND SYSTEMS FOR AUTOMATICALLY PRINTING FILES

TECHNICAL FIELD

The disclosed subject matter relates to methods and systems for document printing, and more particularly, some embodiments relate to methods and systems for providing instant printing services as well as controlling, or assisting the control of, automatic or computer-assisted printing of documents or other media.

BACKGROUND

Generally, print devices are installed in communication with a computer system either directly connected to the computer system or connected remotely over a communication network. Printers (e.g., laser printers, ink type printers, plotters, thermal printers, and other print devices, etc.) can require multiple print configuration settings that can be easily facilitated by a computer system. For example, a user may use a computer to define print settings such as size, contrast, color, number of copies, paper type, printing resolution, duplex/single-side printing, margins, etc. Typically, such print settings are mandatorily prompted to the user each time a print command is received by the computer system, which can become cumbersome in cases where a large variety of documents with different print setting specifications are required to be printed. For some print devices, a provision of default print settings was introduced with certain pre-configured print settings as the default setting for every print job. Such default configurations greatly reduced the time and effort required in printing large quantities of different documents. However, even using such default configuration settings, users were still required to select whether or not a print job was to be executed using the default print configuration settings.

Further, use of computer systems in conjunction with the printers provided an ease of transferring printable data from the internal memory of the computer systems to the printers. In addition, the use of the computer systems further facilitated printing of data stored in external memory devices such as USB drives, memory cards, disk drives, etc. However, some printers (hereinafter, referred to as "multi-function devices") support direct access to external memory devices, such as USB drives, for printing, without any intervention of an external computer system. Such multi-function devices are pre-equipped with their own display module and user interface.

Typically, the multi-function devices are configured to detect presence of an external storage device that is in communication with at least one peripheral port on the multi-function devices. The multi-function devices are further configured to present a graphical user interface to their users for facilitating the users in selecting at least one file for printing. However, the size or quality of the display module and the graphical user interface of the multi-functional devices may not be very user friendly. Therefore, each time when a user tries to print a file directly from an external memory device, the user must manually manipulate the file directory on the external memory device via the user interface in order to locate the file of interest on the external memory device. In addition, the users are prompted by print configuration software for print settings each time the user prints a file, which can be frustrating to the user, for example in case where a large variety of documents are required to be printed.

Therefore, there exists a need for printing methods or systems that can automatically print a large variety of desired documents from an external memory device directly connected to a print device, such as without or with minimal human intervention.

SUMMARY

It may be beneficial to effectively predetermine a user's default print configuration settings to facilitate printing documents and other media on a print device. Some embodiments of the present invention provide an apparatus for automatically printing electronic files stored inside an external storage device using pre-set printing preferences. The apparatus can include a peripheral port for communicating with the external storage device and a control section comprising a memory for storing computer readable program code. The apparatus can further comprise a processor for executing the code to control the apparatus. Further, the computer readable program code can be configured to cause the apparatus to execute a process for detecting a trigger event caused by wireless or physical coupling of the external storage device with the peripheral port. The external storage device may store at least one of a printable file, access link of a printable file stored at remote location, and an optional instruction defining at least one print configuration setting. The computer readable program code is further configured to cause the apparatus to execute a process for fetching the printable files, determining availability of the optional instruction in the external storage device, and printing at least one copy of the fetched printable files based on the determined availability of the optional instruction. The fetched printable files are printed using default print settings if the optional instruction is determined unavailable. Further, the fetched printable files are printed using print settings defined in the optional instruction if the optional instruction is determined available.

Embodiments of the present invention include a control method for a printer apparatus, which causes the printer apparatus to automatically print printable files stored inside an external storage device using pre-set printing preferences of a user. The method comprises steps of detecting a trigger event caused by coupling of the external storage device with the printer apparatus, wherein the external storage device storing at least one of a printable file, access link of a printable file stored at remote location, and an optional instruction defining at least one print setting. The method further comprises steps of fetching the printable files, determining availability of the optional instruction in the external storage device, and printing at least one copy of the fetched printable files based on the determined availability of the optional instruction. In an embodiment, the fetched printable files are printed using default print settings if the optional instruction is determined unavailable. In another embodiment, the fetched printable files are printed using print settings defined in the optional instruction if the optional instruction is determined available.

Embodiments of the present invention can include a computer program product that includes a computer program which, when executed on a printer apparatus, causes the printer apparatus to perform the steps of detecting a trigger event caused by coupling of the external storage device with the printer apparatus, wherein the external storage device storing at least one of a printable file, access link of a printable file stored at remote location, and an optional instruction defining at least one print setting. The printer apparatus further performs steps of fetching the printable files, determining availability of the optional instruction in the external storage device, and printing at least one copy of the fetched printable files based on the determined availability of the optional instruction. In an embodiment, the fetched printable files are printed using default print settings if the optional instruction is determined unavailable. In another embodiment, the fetched printable files are printed using print settings defined in the optional instruction if the optional instruction is determined available.

It may therefore be beneficial to provide a unique method of automatically printing documents or other media stored on external memory devices. Therefore, the method is fast, efficient, and reliable. The various embodiments can be implemented on any print device that can communicate with an external memory device and can perform printing functions using configurable software drivers. Embodiments can also provide a unique way of allowing a user to easily override a printer's default print settings and receive desired number of copies of a printable document.

DETAILED DESCRIPTION

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Definitions

In various embodiments, definitions of one or more terms that will be used to describe various aspects are described below. The term "external storage device" defines any portable storage device that supports a memory and a physical or wireless communication bus including, but not limited to, USB memory drives, memory cards, hard drives, etc. The term "peripheral port" indicates a port on a printer that allows coupling with the external storage device for facilitating communication with the external storage device. The term "pre-set printing preferences" indicates default settings of a printer that can be configured by a user. The term "access link" refers to any link that can be used to refer a file stored at a remote location, for example, URL, IP address, MAC address, Memory address, and like. The term "optional instruction" refers to at least one print setting of the printer that is used to override printer's default print settings.

Figure 1:
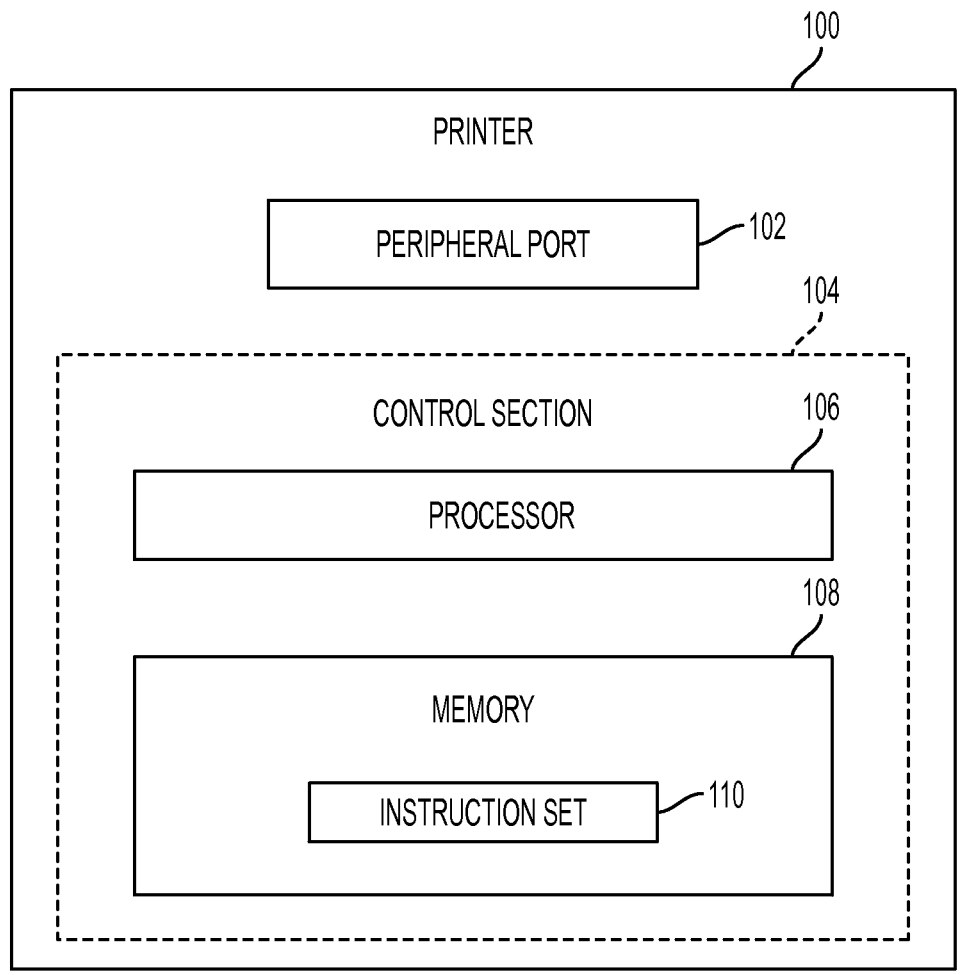
FIG. 1 illustrates an exemplary block diagram of a printer apparatus for printing digital documents, in accordance with aspects of the embodiments.

FIG. 1 illustrates an exemplary block diagram of a printer apparatus 100 used for printing digital file on a medium, for example a digital document printed onto paper, in accordance with an aspect of the embodiments. The printer 100 (e.g., laser printer, ink type printer, plotter, thermal printer, label printer, or other print devices, etc.) includes a peripheral port 102 to support coupling and communication with at least one external storage device 202 (see FIG. 2). Further shown in FIG. 1 is a control section 104 that may or may not be a physical component of the printer 100. The control section 104 is highlighted with dotted line in FIG. 1 to illustrate the control section 104 as a logical component of the printer 100 comprising at least one processor 106 and at least one memory 108.

The memory 108 may store profiles of one or more users. In an embodiment, users of the printer 100 may create and store user profiles in the printer 100. Each user profile can include the user's preferred print settings or print preferences. The users may use a graphical user interface (GUI) of the printer 100 to store their profiles and the print preferences in advance of printing a digital file. In addition, the memory 108 may store user log-in credentials corresponding to the user profiles for uniquely identifying a user and user's pre-stored print preferences/settings.

Further, the control section 104 may use the memory 108 for storing computer readable program code in an instruction set 110. The computer readable program code may be executed by the processor 106 to control functionalities of the printer apparatus 100. In an exemplary embodiment, the instruction set 110 comprises computer readable program code that enables the printer apparatus 100 to automatically detect a trigger event caused by coupling of the external storage device 202 into the peripheral port 102. These computer programs with computer readable program code can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages. The disclosed computer programs can be implemented as instruction sets 110 on non-transitory computer readable carriers adapted to allow the processor 106 to execute the instruction sets 110.

In an embodiment of the present invention, the external storage device 202 may store at least one printable file, access link of a printable file that is stored at a remote location, and/or an optional instruction, which defines at least one print setting supported by the printer apparatus 100. Example of the at least one print setting may include, but is not restricted to, number of copies to be printed of a related printable file.

In the embodiments, the instruction set 110 enables the printer apparatus 100 to fetch the printable files stored in the external storage device 202 or at a remote location (information corresponding to which is stored in the external storage device 202 in the form of an access link) via a network (not shown). Examples of the network may include, but not restricted to, a communication network such as Internet, Intranet, PSTN, Local Area Network (LAN), Wide Area Network (WAN), Metropolitan Area Network (MAN), and so forth. The fetching of the printable files facilitates the printer apparatus 100 to print the printable files on paper(s) via its state of the art mechanisms.

For example, a user may need to print two documents out of which a first document is stored on a hard drive of the user's computer and a second document is published on the Internet. Therefore, to leverage the embodiments, the user may create a pre-designated folder in the external storage device, such as a USB memory drive, with a pre-designated name (e.g., "InstaPrint") and then copy the document (stored on the hard drive) inside the pre-designated folder. Further, the user may create a notepad file (or any type of document formatted file) inside the external storage device 202 with a pre-designated name (e.g., "InstaPrintURL") to store the URL of document published on the Internet inside the notepad file. The notepad file may be used to provide the printer apparatus 100 with an Internet link corresponding to a printable file that is required to be fetched over the Internet from the specified URL. Therefore, after user inserts the USB memory drive into the printer apparatus 100, the processor 106 will execute the instruction set 110 and automatically fetch the two documents from the external storage device and from the Internet for printing.

It will be appreciated by a person skilled in the art that the various embodiments are not restricted to any one or more specific types of print settings available in different types of printers and the scope of embodiments covers all types of print settings/preferences that can be configured in a printing apparatus. Examples of such print settings may include, but are not restricted to, size, contrast, color, number of copies, paper type, printing resolution, duplex/single-side printing, margins, etc.

Further, the instruction set 110 enables the printer apparatus 100 to scan the external storage device 202 for determining availability of at least one optional instruction in the external storage device 202 corresponding to at least one printable file. In an embodiment, the optional instruction may be encoded to a digital folder on the external storage device 202 comprising the printable files or may be encoded to the printable files themselves. Further, the optional instruction may include at least one print setting information for the printer apparatus 100. In case of unavailability of the optional instruction corresponding to the printable files, the printer apparatus 100 may be configured to print at least one copy of a printable file using default print settings. Further, in case of availability of the optional instruction corresponding to a printable file, the printer apparatus 100 may be configured to override (either temporarily or permanently) the default print instructions provided in the optional instructions for printing files.

In an embodiment of the present invention, the printer apparatus 100 may have pre-stored print preferences of a plurality of users. Further, the printer apparatus 100 may allow the plurality of users to login by providing pre-stored credentials for accessing and updating their print preferences. In an exemplary embodiment of the present invention, the printer apparatus 100 may be configured to use default print settings if no user is logged-in to the printer apparatus 100. In another embodiment of the present invention, the printer apparatus 100 may be configured to use pre-stored print preferences of a user if the user is pre-logged-in to the printer apparatus 100.

For example, a user may need to print two documents. The user may need three copies of the first document and only single copy of the second document. Using a separate computer system, the user may then create a pre-designated folder (inside the external storage device 202) with a pre-set name (e.g., "instaprint") and then add the second document inside the "instaprint" folder for ensuring a single print of the second document (based on default print settings). Thereafter, to prepare a file that will print three copies of the first document, the user may create a sub-folder inside the 'instaprint' folder and may name the sub-folder as "3" (this step may be referred to as an example of encoding sub-folder with optional instruction). The user may then add the first document inside the sub-folder named as "3". After connecting the external storage device 202 to the printer apparatus 100, the processor 106 may automatically print one copy of the second document and three copies of the first document by recognizing the folder name of the sub-folder as an optional instruction for printing the three copies of the first document.

In another example, a user may directly place all printable files inside a USB drive and connect the USB drive to the printer apparatus 100, whereupon the printer apparatus 100 automatically prints all the printable files stored in the USB drive with default print settings. Further, the user may rename the files stored in the USB drive with certain print instructions (e.g., optional instructions). For example, a digital document file with a file name "10" may be recognized by the processor 106 as requiring to be printed 10 times, considering the file name "10" as the optional instruction for printing 10 copies. In another example, the user may rename the files as "3_double_BNW", which may be interpreted by the processor 106 as an optional instruction to print "3" copies of the file with "double side" page printing in "black and white" color option. In yet another example, the user may rename the files as "20PS", which may be interpreted by the processor 106 as an optional instruction to print 20 copies with 'Punch' and 'Staple' on the printed papers. Also, the user may rename the files as "20PLM", which may be interpreted by the processor 106 as an optional instruction to print 20 copies with 'Punch' on the printed papers on 'Left' Middle' side of the paper. Similarly, a plurality of print settings may be embedded and/or encoded to a file or a folder on the external storage device for instructing the printer apparatus 100 to print accordingly. Such instructions may need to be restricted under certain syntax rules.

It will be appreciated by a person skilled in the art that the exemplary embodiments are not restricted to any particular format of encoding print settings on a file or on a folder. The embodiments advantageously disclose a technique of encoding files and folders in a user friendly manner, which will dramatically reduce human effort in printing variety of documents in large quantities. The embodiment are intended to include or otherwise cover all permutations and combinations of print settings stored inside files/folders and on file-names/folder-names. Further, implementation of the embodiments may not require any hardware specific changes in printing devices, because various printing device software modules are sufficient in instructing printers according to the methods disclosed herein. It can therefore be beneficial to allow a user to use his/her portable memory devices for taking printouts with desired print settings, without interaction with user interfaces of printers, and with minimal or no wait time.

Figure 2:
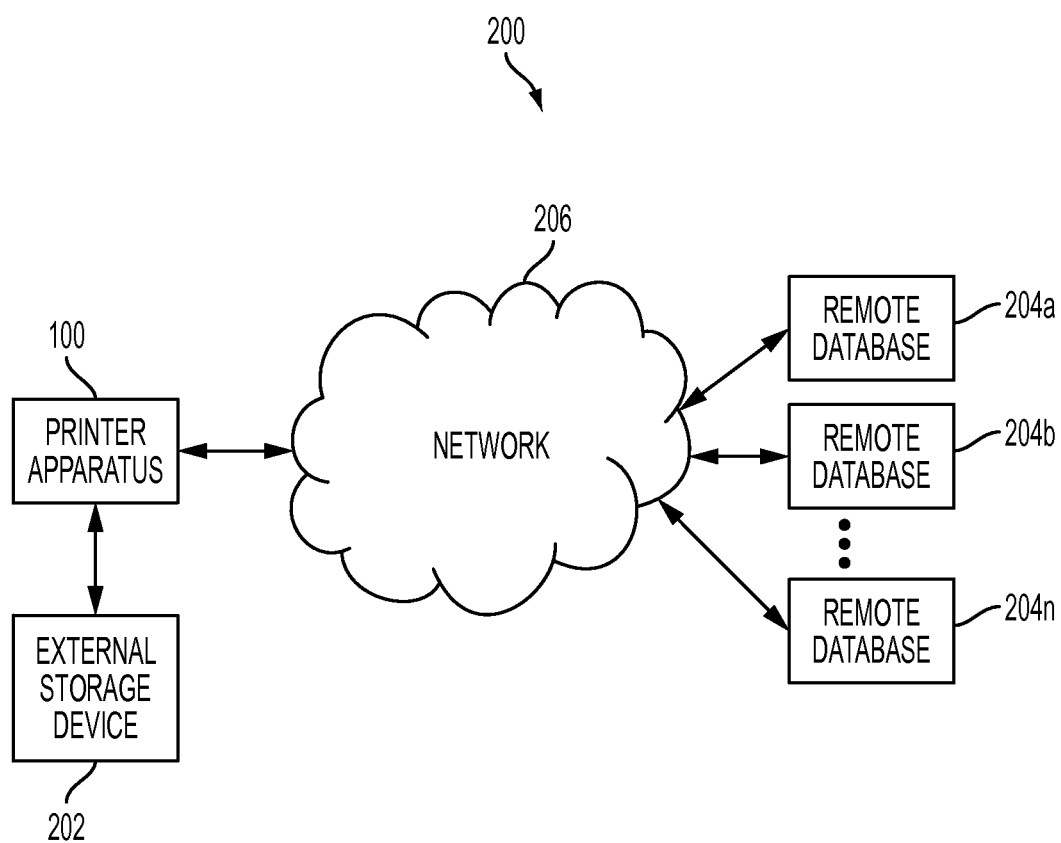
FIG. 2 illustrates an exemplary environment where various embodiments can be implemented.

FIG. 2 illustrates an exemplary environment 200, where various embodiments of the present invention can be implemented. The environment 200 includes the printer apparatus 100 (as defined earlier in conjunction with FIG. 1 of the present invention) connected to the external storage device 202. Examples of the external storage device 202 may include, but are not restricted to memory cards, USB drives, hard disk drives, etc. In an exemplary embodiment of the present invention, the external storage device 202 can be coupled with a peripheral port (not shown) of the printer apparatus 100. Further, the printer apparatus 100 is connected to a plurality of remote databases 204 a, 204 b . . . 204 n via a network 206. The remote databases 204 a, 204 b . . . 204 n (hereinafter may collectively be referred to as "remote databases 204") may refer to electronic storage devices that may be utilized by users to save data.

Examples of the remote databases 204 may include any electronic device that can be connected to the network 206, for example, a data server, third party databases, hard drives, personal computer, a mobile phone, a smart phone, a personal digital assistant (PDA), a tablet computer, a laptop, etc. The network 106 may include, but is not restricted to, a communication network such as Internet, Intranet, PSTN, Local Area Network (LAN), Wide Area Network (WAN), Metropolitan Area Network (MAN), and so forth. In an embodiment, the printer apparatus 100 may include a network adapter (not shown) for connecting the printer apparatus 100 with the network 206.

In an exemplary embodiment, the printer apparatus 100 can be configured for automatically printing printable files stored inside the external storage device 202 using pre-set printing preferences (e.g., default print settings). In an embodiment, the pre-set printing preferences are configurable by a user of the printer apparatus 100 via a user interface, such as a webpage. In another embodiment, the pre-set printing preferences at least define a number of copies to be printed of the printable file in absence of the optional instruction. In yet another embodiment, the pre-set printing preferences can include print layout settings. The printer apparatus 100 includes a peripheral port (not shown) for communicating with the external storage device 202. The printer apparatus 100 is further configured to execute a process for detecting a trigger event caused by coupling of the external storage device 202 into the peripheral port. In an embodiment, the external storage device 202 may comprise at least one printable file, at least one access link of a printable file stored at remote location, or at least one optional instruction defining at least one print setting.

Further, the printer apparatus 100 is configured to scan the external storage device 202 to identify printable files and access links to the printable files. Thereafter, the printer apparatus may fetch the printable files from the external storage device 202 or from the remote databases 204 with the help of the access links and the network 206 in real time for printing. The printer apparatus 100 is further configured to execute a process for determining availability of the optional instruction in the external storage device and printing at least one copy of the fetched printable files based on the determined availability of the optional instruction. If the optional instruction is determined unavailable, the fetched printable files are printed using default print settings. Otherwise, the fetched printable files are printed using print settings defined in the optional instruction.

The printer apparatus 100 can be further configured to use default print settings in conjunction with the optional instruction in case if the optional instruction does not provide all required print settings. Further, the printer apparatus 100 is configured to automatically and/or instantly print an instructed number of copies of the fetched printable file as defined in the optional instruction. Furthermore, the printer apparatus 100 is configured to automatically and/or instantly print at least one copy of the fetched printable file in absence of the optional instruction.

In an exemplary embodiment, printable files are dedicatedly stored in a pre-designated folder created and stored in the external storage device 202 for enabling the printer apparatus 100 to uniquely identify the folder having printable files. The name of the pre-designated folder may be pre-set with the printer apparatus 100 by the user via a command provided to the processor 106 through the printer apparatus' GUI. In addition, the user may be allowed to pre-set alternative types of print settings with the printer apparatus 100 in advance. For example, if a user pre-sets a name of the pre-designated folder as "xyz", then the printing apparatus 100 may search for a folder in the external storage device 202 with the name "xyz" to locate the printable files.

Further, in an embodiment, the optional instructions are encoded to a folder that includes printable files, for example, the pre-designated folder or a sub-folder of the pre-designated folder. In another embodiment, the optional instructions are encoded to the printable files themselves. In yet another embodiment, the optional instructions are stored inside the pre-designated folder or inside a sub-folder of the pre-designated folder, wherein the sub-folder comprises at least one printable file, or at least one access link file as a pointer to a printable file. A folder or a file may be encoded with the optional instructions either by adding instruction details in name of the files or folders or by adding a dedicated setting file or information inside the files or folders. The format of adding the instruction information is not limited, and any computer readable format may be used to provide the instruction details.

Figure 3:
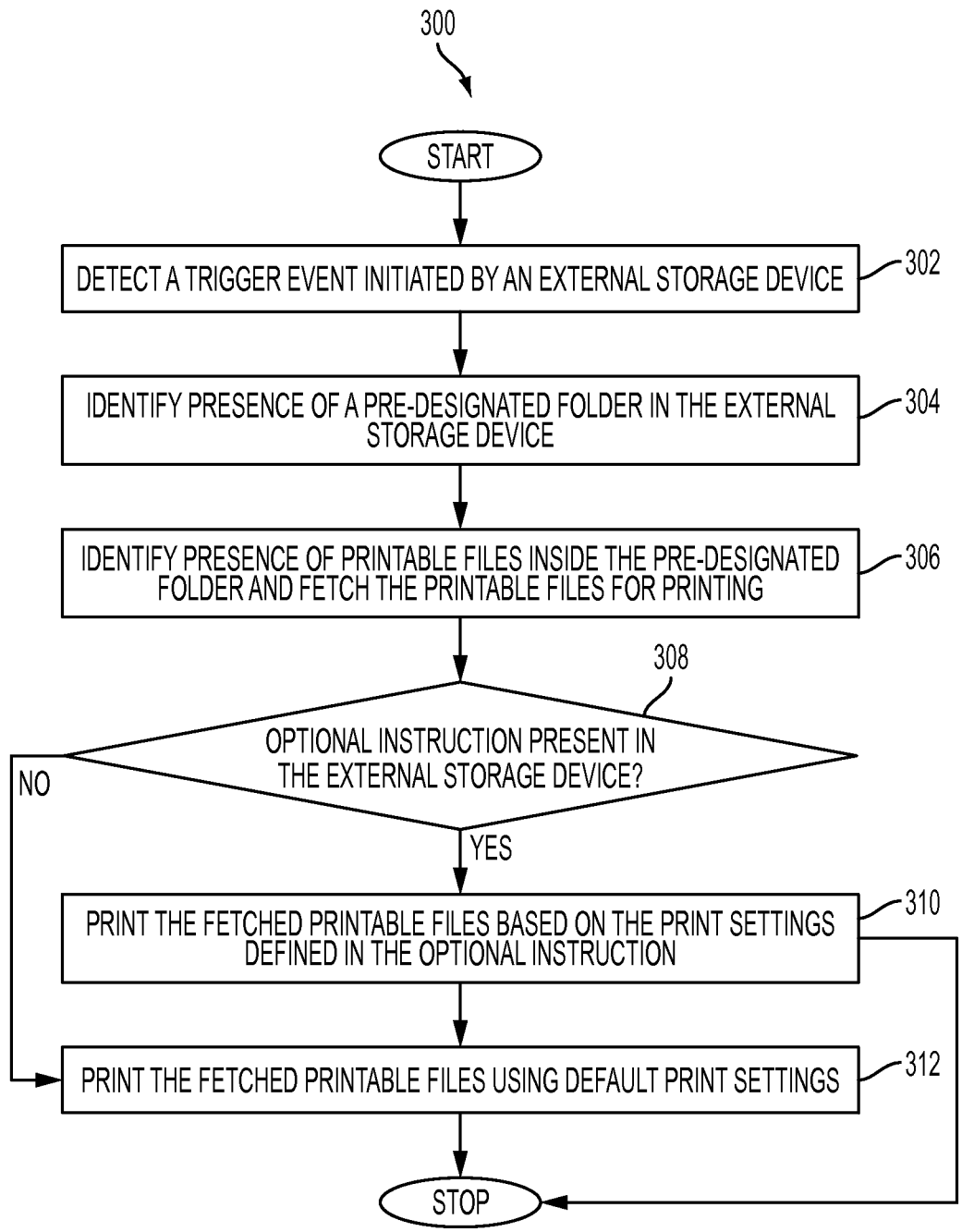
FIG. 3 illustrates a flow diagram of a method for automatically printing documents from an external storage device, in accordance with aspects of the embodiments.

FIG. 3 illustrates a flow diagram 300 of a method for automatically printing documents from the external storage device 202 without any user intervention, in accordance with an embodiment. In an exemplary embodiment, a user stores a plurality of printable files inside a pre-designated folder of the external storage device 202 with optional instructions corresponding to certain printable files. Thereafter, the user plugs the external storage device 202 into the printer apparatus 100 for printing the printable files according to pre-defined print settings in conjunction with the optional instructions.

Proceeding to step 302, the printer apparatus 100 processor 106 detects a triggering event caused by connection with the external storage device 202. At step 304, the processor 106 identifies a presence of a pre-designated folder (as described earlier in conjunction with FIG. 1 and FIG. 2) in the external storage device 202. Thereafter, at step 306, the processor 106 identifies presence of printable files inside the pre-designated folder and fetches the printable files for printing purposes. Further, at step 308, the processor 106 determines if certain optional instructions (as described earlier in conjunction with FIG. 1 and FIG. 2) are also available in the external storage device 202. If optional instructions are identified, then the method may proceed to step 310. Otherwise, if the optional instructions are not identified, then the method may proceed to step 312.

If optional instructions are identified in step 308, then at step 310 the processor 106 instructs the printer apparatus 100 to print the fetched printable files based on the print settings defined in the optional instructions. Further, in an embodiment, the print settings defined in the optional instructions may be used in conjunction with default print settings of the printer apparatus 100, which can be set in advance by a user of the printer apparatus 100. The optional instructions may include at least one print setting of the printer apparatus 100 that can be encoded to a folder or sub-folder stored inside the pre-designated folder of the external storage device 202. Further, at step 312, the printer apparatus prints the fetched printable files based on the default print settings.

If the optional instructions are not identified in step 308, then after the user connects the external storage device 202 with the printer apparatus 100, in step 312 the processor 106 instructs to the printing apparatus 100 to print the printable files according to pre-defined default print settings in conjunction with the optional instructions.

For example, the pre-designated file may be a notepad file (not restricting scope of the present invention) with a pre-set name such as "InstaPrint_URL.txt". The notepad file may further store therein at least one URL of a printable file stored at a remote location. Further, the user may encode the pre-designated file with optional instruction. In an embodiment, the pre-designated file may be stored inside a pre-designated folder of the external storage device 202. In yet another embodiment, the user may store the pre-designated file inside an encoded sub-folder of the pre-designated folder. The encoded sub-folder may include optional instruction information embedded in the name of the sub-folder.

Figure 4:
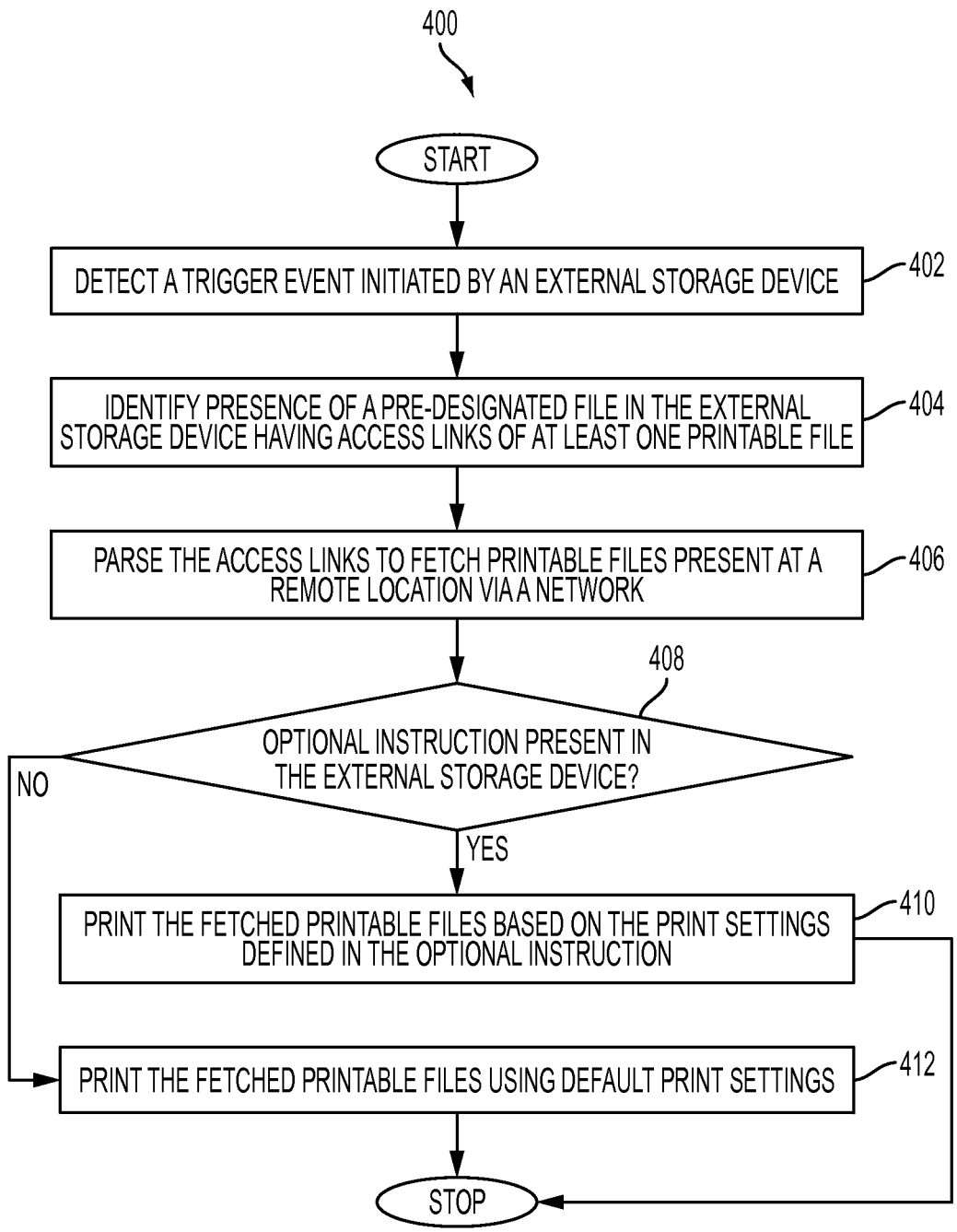
FIG. 4 illustrates a flow diagram 400 of a method for automatically printing documents present at remote locations, in accordance with aspects of the embodiments.

FIG. 4 illustrates a flow diagram 400 of a method for automatically printing documents present at remote locations without any user intervention, in accordance with an embodiment of the present invention. In an exemplary embodiment, a user stores at least one pre-designated file in the external storage device having stored therein access links of at least one printable file. At step 402, the printer apparatus detects a triggering event caused due to coupling with the external storage device and at step 304, identifies presence of a pre-designated file in the external storage device 202 having access links of at least one printable file. Thereafter, at step 406, the processor 106 parses the access links to fetch printable files present at a remote location via the network 206 such as the Internet. Further, at step 408, the processor 106 determines if certain optional instructions are also available in the external storage device 202. If optional instructions are identified, then the method may proceed to step 410. Otherwise, if the optional instructions are not identified, then the method may proceed to step 412.

At step 410, the printer apparatus 100 prints the fetched printable files based on the print settings defined in the optional instructions. Further, in an embodiment, the print settings defined in the optional instructions may be used in conjunction with default print settings of the printer apparatus 100, which can be set in advance by a user of the printer apparatus 100. The optional instructions may include at least one print setting of the printer apparatus 100 that can be encoded to a folder or sub-folder stored inside the pre-designated folder of the external storage device 202. Further, at step 412, the printer apparatus 100 prints the fetched printable files based on the default print settings.

Figure 5:
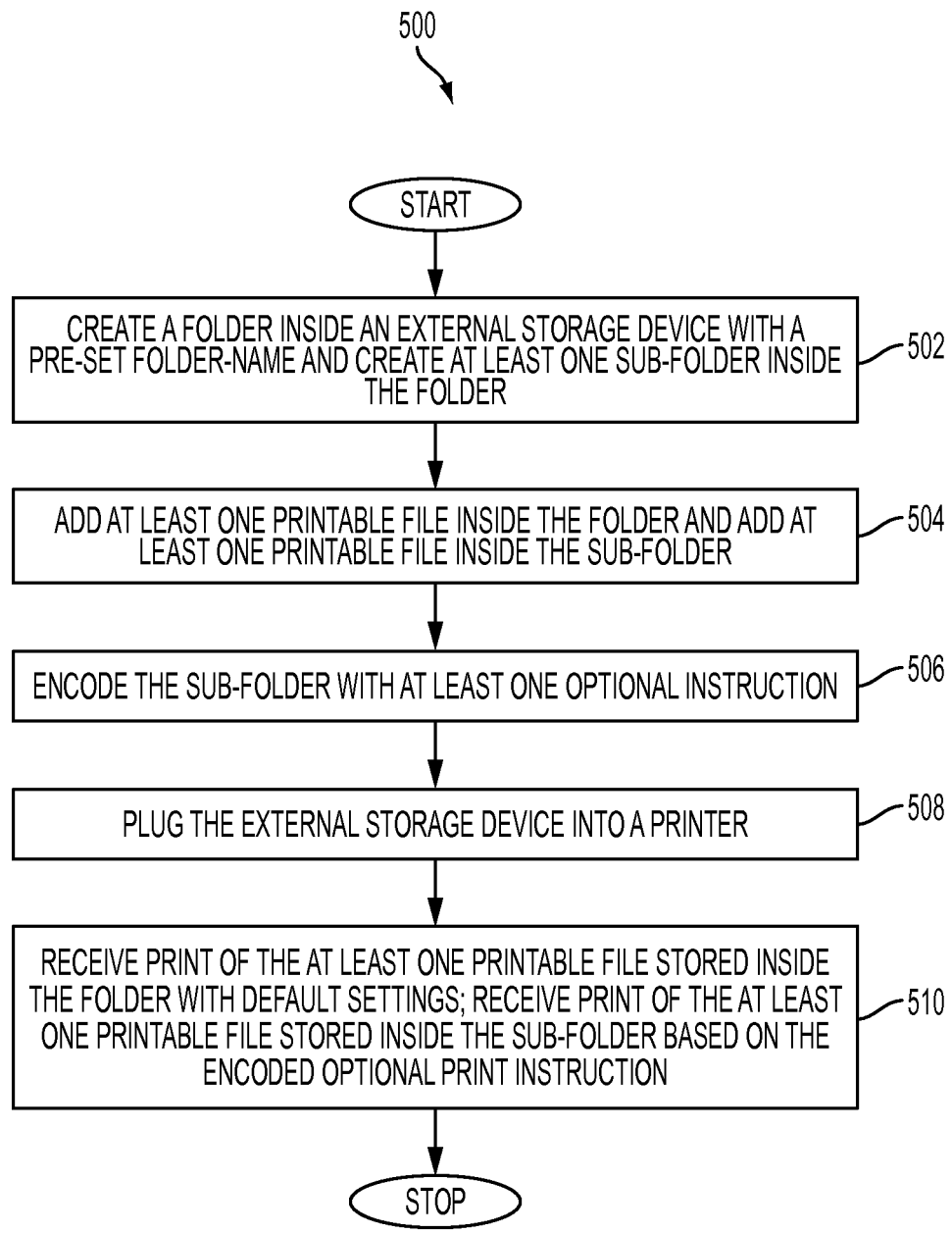
FIG. 5 illustrates a flow diagram 500 of a method for instantly printing documents from an external storage device, in accordance with aspects of the embodiments.

FIG. 5 illustrates a flow diagram 500 of a method for instantly printing documents from an external storage device, in accordance with an embodiment of the present invention. At step 502, a user of the printer apparatus 100 creates a folder inside an external storage device 202 with a pre-set folder-name and create at least one sub-folder inside the folder. Thereafter, at step 504, the user adds at least one printable file inside the folder and adds at least one printable file inside the sub-folder. The sub-folder is then encoded with at least one optional instruction at step 506.

In an embodiment, the encoding of the sub-folder may include adding print setting information in the name of the sub-folder. In another embodiment, the encoding of the sub-folder may include addition of a setting-file inside the sub-folder comprising at least one print setting information, which can be parsed by the processor 106 to determine desired print settings of a user. Thereafter, at step 508, the user connects the external storage device with the printer apparatus 100. At step 510, the processor 106 recognizes the print setting information and executes a print instruction to the printer apparatus 100, whereupon the user receives a print of the at least one printable file stored inside the folder with default print settings. For example, at the step 510, the user can receive a print of the at least one printable file stored inside the sub-folder based on the encoded optional print instruction.

Figure 6:
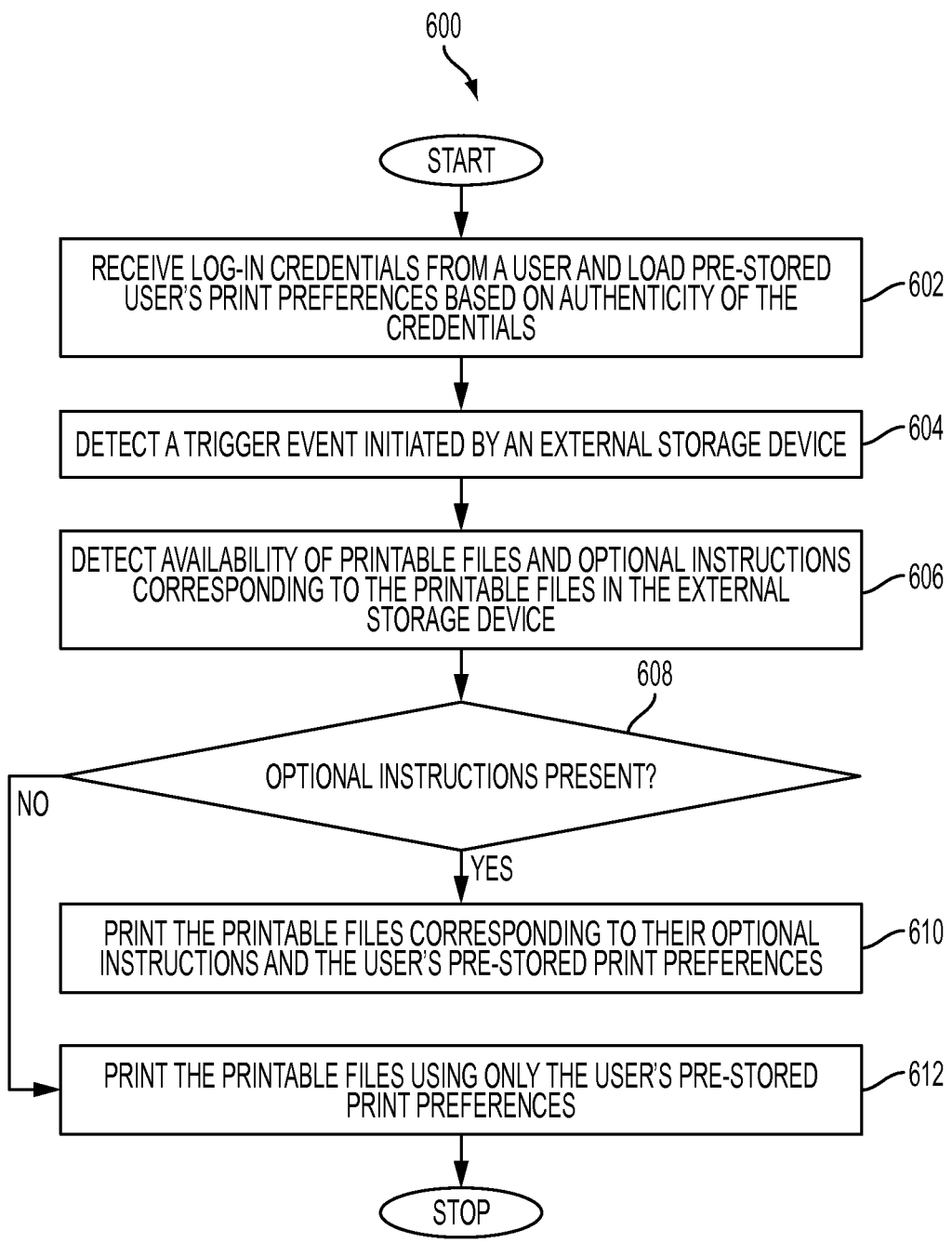
FIG. 6 illustrates a flow diagram 600 of a method for automatically printing documents from an external storage device based on a user's predetermined configuration preferences, in accordance with aspects of the embodiments.

FIG. 6 illustrates a flow diagram 600 of a method for automatically printing documents from an external storage device based on user's pre-stored preferences, in accordance with an aspect of the embodiments. In an embodiment, a user can pre-store one or more print preferences in the memory 108 of the printer apparatus 100 for facilitating desired print settings each time after logging into the printer apparatus 100.

At step 602, the printer apparatus 100 receives login credentials from a user and loads pre-stored user's print preferences based on authenticity of the credentials provided by the user. Thereafter, the user stores a plurality of printable files inside a pre-designated folder of the external storage device 202 with optional instructions corresponding to certain printable files. The user then connects the external storage device 202 with the printer apparatus 100 for printing the printable files according to pre-defined print settings in conjunction with the optional instructions. At step 604, the processor 106 detects a triggering event caused due to connection with the external storage device 202 and identifies a presence of a pre-designated folder in the external storage device.

Thereafter, at step 606, the processor 106 identifies a presence of printable files inside the pre-designated folder and fetches the printable files for printing purposes. Further, at step 608, the processor 106 determines if certain optional instructions (as described earlier in conjunction with FIG. 1 and FIG. 2) are also available in the external storage device 202. If optional instructions are identified by the processor 106, then the method may proceed to step 610. Otherwise, if the optional instructions are not identified, then the method may proceed to step 612.

At step 610, the processor 106 instructs the printer apparatus 100 to print the fetched printable files based on the print settings defined in the optional instructions. Further, in an embodiment, the print settings defined in the optional instructions may be used in conjunction with pre-stored print preferences of the user, which can be set in advance by a user of the printer apparatus 100. The optional instructions may include at least one print setting of the printer apparatus 100 that can be encoded to a folder or sub-folder stored inside the pre-designated folder of the external storage device 202. Further, at step 612, the printer apparatus 100 prints the fetched printable files using only the user's pre-stored print preferences.

It will be appreciated that several of the above-disclosed and other features and functions, or alternatives or equivalents thereof, may be desirably combined into many other different systems or applications. Various presently unforeseen or unanticipated alternatives, modifications, variations, or improvements therein may subsequently be made by those skilled in the art, which are also intended to be encompassed by the following claims.

What is claimed is:

1. An apparatus for automatically printing at least one printable file stored inside an external storage device, using pre-set printing preferences, the apparatus comprising:
   a peripheral port for communicating with the external storage device;
   a control section comprising a memory for storing computer readable program code; and
   a processor for executing the computer readable program code to control the apparatus, the computer readable program code being configured to cause the apparatus to execute a process for:
      detecting a trigger event caused by connecting the external storage device with the peripheral port, wherein:
         the external storage device stores a printable file in a pre-designated folder and an optional instruction defining at least one print setting, and
         the pre-designated folder has a folder name indicative of a number of copies to be printed;
      scanning the external storage device to identify presence of the printable file from the external storage device and fetching the identified printable file for printing from the external storage device;
      determining availability of the optional instruction in the external storage device; and
      printing at least one copy of the fetched printable file based on the determined availability of the optional instruction, wherein:
         the number of copies indicated by the folder name are printed for the fetched printable file automatically,
         the fetched printable file is automatically printed using default print settings if the optional instruction is determined unavailable, and
         the fetched printable file is printed using print settings defined in the optional instruction if the optional instruction is determined available.

2. The apparatus of claim 1, wherein the fetched printable file is printed using pre-set printing preferences of a user logged into the apparatus if the optional instruction is determined unavailable.

3. The apparatus of claim 2, wherein the pre-set printing preferences are amendable.

4. The apparatus of claim 3, wherein the pre-set printing preferences define a number of copies to be printed of the printable file in absence of the optional instruction.

5. The apparatus of claim 3, wherein the pre-set printing preferences further comprise print layout settings.

6. The apparatus of claim 1, wherein the optional instruction is encoded to a name of a folder comprising the printable file.

7. The apparatus of claim 1, wherein the optional instruction is encoded to a filename of the printable file.

8. The apparatus of claim 1, wherein the optional instruction is stored inside a pre-designated folder in the external storage device.

9. The apparatus of claim 1, wherein the optional instruction is encoded to a name of a sub-folder residing inside a pre-designated folder, the sub-folder further comprising at least one of the printable file and an access link to the printable file.

10. The apparatus of claim 9, wherein the access link comprises a Uniform Resource Locator (URL) of the printable file, the printable file being stored at a remote location.

11. The apparatus of claim 9, wherein the processor is further configured to identify the at least one access link stored inside the external storage device to access, retrieve, and print a printable file referred by the access link at a remote location.

12. The apparatus of claim 1, wherein the peripheral port is a memory card reading port.

13. The apparatus of claim 1, wherein the peripheral port is a Universal Serial Bus (USB) port.

14. The apparatus of claim 1, further comprising a network adapter for connecting the apparatus with a network.

15. The apparatus of claim 1, wherein the fetching of the printable file comprises fetching the printable file from a remote location via a network.

16. A control method for a printer apparatus to automatically print printable files stored inside an external storage device, using pre-set printing preferences of a user, the method comprising:
   detecting, by a processor, a trigger event caused by connecting the external storage device with the printer apparatus, wherein:
      the external storage device stores a printable file in a pre-designated folder and an optional instruction defining at least one print setting, and
      the pre-designated folder has a folder name indicative of a number of copies to be printed;
   by the processor, scanning the external storage device to identify presence of the printable file from the external storage device and fetching the identified printable file for printing from the external storage device;
   determining, by the processor, availability of the optional instruction in the external storage device; and
   printing at least one copy of the fetched printable file based on the determined availability of the optional instruction, wherein:
      the number of copies indicated by the folder name are printed for the fetched printable file automatically,
      the fetched printable file is automatically printed using default print settings if the optional instruction is determined unavailable; and
      the fetched printable file is printed using print settings defined in the optional instruction if the optional instruction is determined available.

17. The control method of claim 16, wherein the fetched printable file is printed using pre-set printing preferences of a user logged in to the apparatus if the optional instruction is determined unavailable.

18. The control method of claim 17, wherein the pre-set printing preferences define the number of copies to be printed of the printable file in absence of the optional instruction.

19. The control method of claim 17, wherein the pre-set printing preferences further comprise print layout settings.

20. The control method of claim 16, wherein the optional instruction is encoded to a name of a folder comprising the printable file.

21. The control method of claim 20, wherein the pre-set printing preferences are configurable for one or more of the triggering events.

22. The control method of claim 16, wherein the optional instruction is encoded to a filename of the printable file itself.

23. The control method of claim 16, wherein the optional instruction is stored inside a pre-designated folder in the external storage device.

24. The control method of claim 16, wherein the optional instruction is encoded to a name of a sub-folder residing inside a pre-designated folder, the sub-folder further comprising at least one of the printable file, and an access link to the printable file.

25. The control method of claim 24, wherein the access link comprises a Uniform Resource Locator (URL) of the printable file, the printable file being stored at a remote location.

26. The control method of claim 24, further comprising identifying, by the processor, the at least one access link stored inside the external storage device to access, retrieve, and print a printable file referred by the access link at a remote location.

27. The control method of claim 16, wherein the fetching of the printable file comprises fetching the printable file from a remote location via a network.

28. An apparatus for automatically printing at least one printable file stored inside an external storage device, using pre-set printing preferences, the apparatus comprising:
 a peripheral port for communicating with the external storage device;
 a control section comprising a memory for storing computer readable program code; and
 a processor for executing the computer readable program code to control the apparatus, the computer readable program code being configured to cause the apparatus to execute a process for:
  detecting a trigger event caused by connecting the external storage device with the peripheral port, wherein:
   the external storage device stores a printable file and an optional instruction defining at least one print setting, and
   the optional instruction is encoded to a name of a folder comprising the printable file;
  scanning the external storage device to identify presence of the printable file from the external storage device and fetching the identified printable file for printing from the external storage device;
  determining availability of the optional instruction in the external storage device; and
  printing at least one copy of the fetched printable file based on the determined availability of the optional instruction, wherein:
   the fetched printable file is automatically printed using default print settings if the optional instruction is determined unavailable, and
   the fetched printable file is printed using print settings defined in the optional instruction if the optional instruction is determined available.

29. The apparatus of claim 28, wherein the fetched printable file is printed using pre-set printing preferences of a user logged into the apparatus if the optional instruction is determined unavailable.

30. The apparatus of claim 29, wherein the pre-set printing preferences are amendable.

31. The apparatus of claim 30, wherein the pre-set printing preferences define a number of copies to be printed of the printable file in absence of the optional instruction.

32. The apparatus of claim 30, wherein the pre-set printing preferences further comprise print layout settings.

33. The apparatus of claim 28, wherein the peripheral port is a memory card reading port.

34. The apparatus of claim 28, wherein the peripheral port is a Universal Serial Bus (USB) port.

35. The apparatus of claim 28, further comprising a network adapter for connecting the apparatus with a network.

36. The apparatus of claim 28, wherein the fetching of the printable file comprises fetching the printable file from a remote location via a network.

37. An apparatus for automatically printing at least one printable file stored inside an external storage device, using pre-set printing preferences, the apparatus comprising:
 a peripheral port for communicating with the external storage device;
 a control section comprising a memory for storing computer readable program code; and
 a processor for executing the computer readable program code to control the apparatus, the computer readable program code being configured to cause the apparatus to execute a process for:
  detecting a trigger event caused by connecting the external storage device with the peripheral port, wherein the external storage device stores a printable file and an optional instruction defining at least one print setting, wherein the optional instruction is encoded to a name of a sub-folder residing inside a pre-designated folder, the sub-folder further comprising at least one of the printable file and an access link to the printable file;
  scanning the external storage device to identify presence of the printable file from the external storage device and fetching the identified printable file for printing from the external storage device;
  determining availability of the optional instruction in the external storage device; and
  printing at least one copy of the fetched printable file based on the determined availability of the optional instruction, wherein:
   the fetched printable file is automatically printed using default print settings if the optional instruction is determined unavailable, and
   the fetched printable file is printed using print settings defined in the optional instruction if the optional instruction is determined available.

38. The apparatus of claim 37, wherein the fetched printable file is printed using pre-set printing preferences of a user logged into the apparatus if the optional instruction is determined unavailable.

39. The apparatus of claim 38, wherein the access link comprises a Uniform Resource Locator (URL) of the printable file, the printable file being stored at a remote location.

40. The apparatus of claim 37, wherein the pre-set printing preferences are amendable.

41. The apparatus of claim 40, wherein the pre-set printing preferences defines a number of copies to be printed of the printable file in absence of the optional instruction.

42. The apparatus of claim 40, wherein the pre-set printing preferences further comprises print layout settings.

43. The apparatus of claim 37, wherein the peripheral port is a memory card reading port.

44. The apparatus of claim 37, wherein the peripheral port is a Universal Serial Bus (USB) port.

45. The apparatus of claim 37, further comprising a network adapter for connecting the apparatus with a network.

46. The apparatus of claim 37, wherein the fetching of the printable file comprises fetching the printable file from a remote location via a network.

47. The apparatus of claim 37, wherein the processor is further configured to identify the at least one access link stored inside the external storage device to access, retrieve, and print a printable file referred by the access link at a remote location.

48. A control method for a printer apparatus to automatically print printable files stored inside an external storage device, using pre-set printing preferences of a user, the method comprising:

detecting, by a processor, a trigger event caused by connecting the external storage device with the printer apparatus, wherein:

the external storage device stores a printable file and an optional instruction defining at least one print setting, and the optional instruction is encoded to a name of a folder comprising the printable file;

by the processor, scanning the external storage device to identify presence of the printable file from the external storage device and fetching the identified printable file for printing from the external storage device;

determining, by the processor, availability of the optional instruction in the external storage device; and printing at least one copy of the fetched printable file based on the determined availability of the optional instruction, wherein:

the fetched printable file is automatically printed using default print settings if the optional instruction is determined unavailable; and the fetched printable file is printed using print settings defined in the optional instruction if the optional instruction is determined available.

49. The control method of claim 48, wherein the fetched printable file is printed using pre-set printing preferences of a user logged in to the apparatus if the optional instruction is determined unavailable.

50. The control method of claim 48, wherein the optional instruction is stored inside a pre-designated folder in the external storage device.

51. The control method of claim 48, wherein the pre-set printing preferences are configurable for one or more of the triggering events.

52. The control method of claim 51, wherein the pre-set printing preferences define the number of copies to be printed of the printable file in absence of the optional instruction.

53. The control method of claim 51, wherein the pre-set printing preferences further comprise print layout settings.

54. The control method of claim 51, wherein the fetching of the printable file comprises fetching the printable file from a remote location via a network.

55. A control method for a printer apparatus to automatically print printable files stored inside an external storage device, using pre-set printing preferences of a user, the method comprising:

detecting, by a processor, a trigger event caused by connecting the external storage device with the printer apparatus, wherein:

the external storage device stores a printable file and an optional instruction defining at least one print setting, and the optional instruction is encoded to a name of a sub-folder residing inside a pre-designated folder, the sub-folder further comprising at least one of the printable file and an access link to the printable file;

by the processor, scanning the external storage device to identify presence of the printable file from the external storage device and fetching the identified printable file for printing from the external storage device;

determining, by the processor, availability of the optional instruction in the external storage device; and printing at least one copy of the fetched printable file based on the determined availability of the optional instruction, wherein:

the fetched printable file is automatically printed using default print settings if the optional instruction is determined unavailable; and the fetched printable file is printed using print settings defined in the optional instruction if the optional instruction is determined available.

56. The control method of claim 55, wherein the fetched printable file is printed using pre-set printing preferences of a user logged in to the apparatus if the optional instruction is determined unavailable.

57. The control method of claim 56, wherein the pre-set printing preferences are configurable for one or more of the triggering events.

58. The control method of claim 57, wherein the pre-set printing preferences define the number of copies to be printed of the printable file in absence of the optional instruction.

59. The control method of claim 58, wherein the pre-set printing preferences further comprise print layout settings.

60. The control method of claim 55, wherein the optional instruction is stored inside a pre-designated folder in the external storage device.

61. The control method of claim 55, wherein the fetching of the printable file comprises fetching the printable file from a remote location via a network.

62. The control method of claim 55, wherein the access link comprises a Uniform Resource Locator (URL) of the printable file, the printable file being stored at a remote location.

63. The control method of claim 55, further comprising identifying, by the processor, the at least one access link stored inside the external storage device to access, retrieve, and print a printable file referred by the access link at a remote location.

* * * * *